United States Patent
Tashiro et al.

(10) Patent No.: US 11,816,795 B2
(45) Date of Patent: Nov. 14, 2023

(54) PHOTO-VIDEO BASED SPATIAL-TEMPORAL VOLUMETRIC CAPTURE SYSTEM FOR DYNAMIC 4D HUMAN FACE AND BODY DIGITIZATION

(71) Applicant: Sony Group Corporation, Tokyo (JP)

(72) Inventors: Kenji Tashiro, San Jose, CA (US); Chuen-Chien Lee, Pleasanton, CA (US); Qing Zhang, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 50 days.

(21) Appl. No.: 17/414,540

(22) PCT Filed: Dec. 20, 2019

(86) PCT No.: PCT/US2019/068151
§ 371 (c)(1),
(2) Date: Jun. 16, 2021

(87) PCT Pub. No.: WO2020/132631
PCT Pub. Date: Jun. 25, 2020

(65) Prior Publication Data
US 2022/0044478 A1 Feb. 10, 2022

Related U.S. Application Data

(60) Provisional application No. 62/782,862, filed on Dec. 20, 2018.

(30) Foreign Application Priority Data

Dec. 20, 2019 (WO) ................ PCT/US2019/068151

(51) Int. Cl.
*G06T 17/20* (2006.01)
*G06V 40/16* (2022.01)
(Continued)

(52) U.S. Cl.
CPC .............. *G06T 17/20* (2013.01); *G06T 15/04* (2013.01); *G06V 40/165* (2022.01);
(Continued)

(58) Field of Classification Search
None
See application file for complete search history.

(56) References Cited

U.S. PATENT DOCUMENTS 9,036,898 B1 * 5/2015 Beeler ..................... G06T 19/20
382/154
9,143,670 B1 * 9/2015 Cilia ....................... H04N 23/66
(Continued)

FOREIGN PATENT DOCUMENTS

EP 3216216 A1 9/2017
EP 3216216 B1 9/2019
(Continued)

OTHER PUBLICATIONS

Tsiminaki, Vagia, Jean-Sébastien Franco, and Edmond Boyer. "High resolution 3d shape texture from multiple videos." Proceedings of the IEEE Conference on Computer Vision and Pattern Recognition. 2014.*

(Continued)

*Primary Examiner* — Sultana M Zalalee
(74) *Attorney, Agent, or Firm* — Haverstock & Owens, A Law Corporation

(57) ABSTRACT

The photo-video based spatial-temporal volumetric capture system more efficiently, produces high frame rate and high resolution 4D dynamic human videos, without a need for 2 separate 3D and 4D scanner systems, by combining a set of high frame rate machine vision video cameras with a set of high resolution photography cameras. It reduces a need for manual CG works, by temporally up-sampling shape and texture resolution of 4D scanned video data from a tempo- (Continued)

rally sparse set of higher resolution 3D scanned keyframes that are reconstructed both by using machine vision cameras and photography cameras. Unlike typical performance capture system that uses single static template model at initialization (e.g. A or pose), the photo-video based spatial-temporal volumetric capture system stores multiple keyframes of high resolution 3D template models for robust and dynamic shape and texture refinement of 4D scanned video sequence. For shape up-sampling, the system can apply mesh-tracking based temporal shape super resolution. For texture up-sampling, the system can apply machine learning based temporal texture super resolution.

21 Claims, 7 Drawing Sheets

(51) Int. Cl.
*G06T 15/04* (2011.01)
*H04N 23/611* (2023.01)
*H04N 23/951* (2023.01)

(52) U.S. Cl.
CPC ......... *G06V 40/171* (2022.01); *H04N 23/611* (2023.01); *H04N 23/951* (2023.01)

(56) References Cited

U.S. PATENT DOCUMENTS

| | | |
|---|---|---|
| 2004/0252193 A1 | 12/2004 | Higgins |
| 2005/0053277 A1 | 3/2005 | Liu et al. |
| 2005/0286759 A1* | 12/2005 | Zitnick, III .......... H04N 5/2627 |
| | | 382/154 |
| 2007/0127810 A1 | 6/2007 | Liu |
| 2008/0094472 A1 | 4/2008 | Ayer et al. |
| 2009/0128568 A1 | 5/2009 | Gloudemans et al. |
| 2013/0046522 A1* | 2/2013 | Kavan .................... G06T 13/20 |
| | | 703/6 |
| 2015/0310263 A1* | 10/2015 | Zhang .................. G06V 40/176 |
| | | 382/103 |
| 2015/0356767 A1 | 12/2015 | Suma et al. |
| 2015/0381885 A1* | 12/2015 | Kim ....................... G06F 3/0482 |
| | | 348/207.1 |
| 2016/0140733 A1 | 5/2016 | Gu |
| 2016/0217319 A1* | 7/2016 | Bhanu .................. G06V 40/172 |
| 2016/0342839 A1* | 11/2016 | Condel ................. G06T 19/006 |
| 2018/0005015 A1* | 1/2018 | Hou ...................... G06V 10/751 |
| 2018/0300927 A1 | 10/2018 | Hushchyn et al. |
| 2018/0336464 A1* | 11/2018 | Karras ...................... G06N 3/08 |
| 2018/0336687 A1* | 11/2018 | Mudretsov ............. G06V 40/25 |
| 2019/0083031 A1* | 3/2019 | Hanina ................. A61B 5/1128 |
| 2019/0130530 A1* | 5/2019 | Schroers ............... G06T 3/4007 |
| 2020/0311871 A1* | 10/2020 | Yu ............................. G06T 7/10 |

FOREIGN PATENT DOCUMENTS

| | | |
|---|---|---|
| JP | 2007102478 A | 4/2007 |
| WO | 2018128996 A1 | 7/2018 |

OTHER PUBLICATIONS

Jiang, Jian, et al. "High quality binocular facial performance capture from partially blurred image sequence." 2013 International Conference on Computer-Aided Design and Computer Graphics. IEEE, 2013. (Year: 2013).*
Tao Yu et al., "DoubleFusion : Real-time Capture of Human Performances with Inner Body Shapes form a Single Depth Sensor", http://openaccess.thecvf.com/content_cvpr_2018/CameraReady/1321.pdf.
Graham Fyffe, "Single-Shot Reflectance Measurement from Polarized Color Gradient Illumination", 978-4799-8667-5/15IEEE, http://ict.usc.edu/pubs/Single-Shot%20Reflectance%20Measurement%20from%20Polarized%20Color%20Gradient%20Illumination.pdf.
Alexandru Eugen Ichim et al., Dynamic 3D Avatar Creation from Hand-held Video Input, http://sofienbouaziz.com/paf/Avatars_SIGG15.pdf.
Pablo Garrido et al., "Reconstruction of Personalized 3D Face Rigs from Monocular Video", ACM Transactions on Graphics, https://web.stanford.edu/~zollhoef/papers/SG2016_FaceRig/paper.pdf.
The International Search Report for International Application : PCT/US2019/068151 dated Apr. 9, 2020.
The Written Opinion for International Application : PCT/US2019/068151 dated Apr. 9, 2020.

* cited by examiner

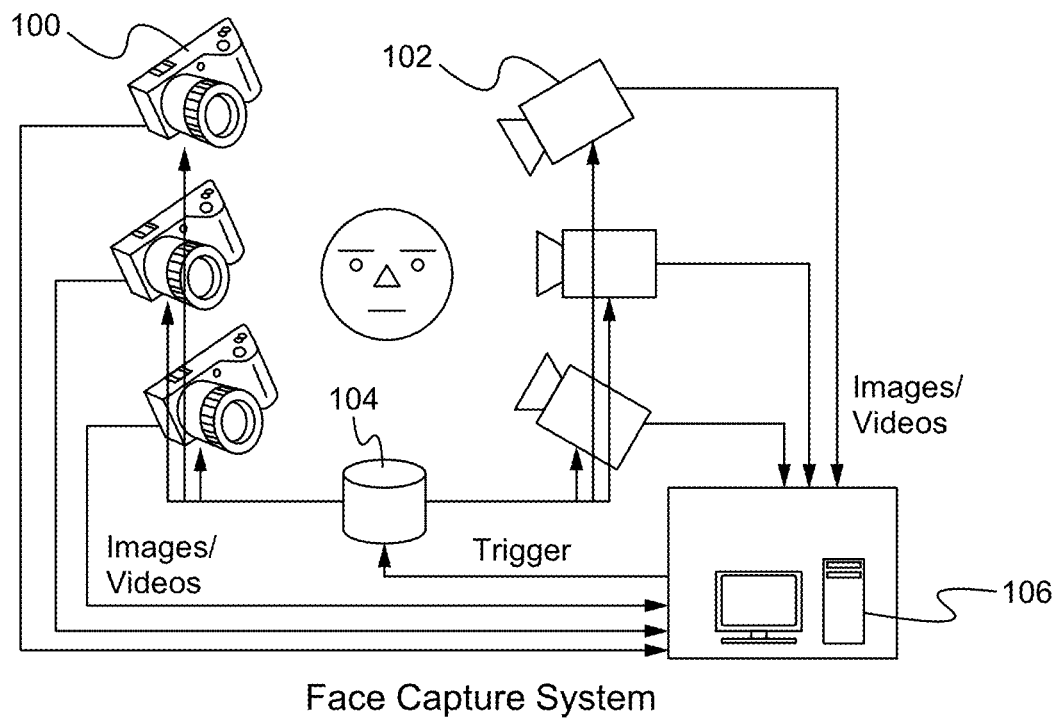
Face Capture System
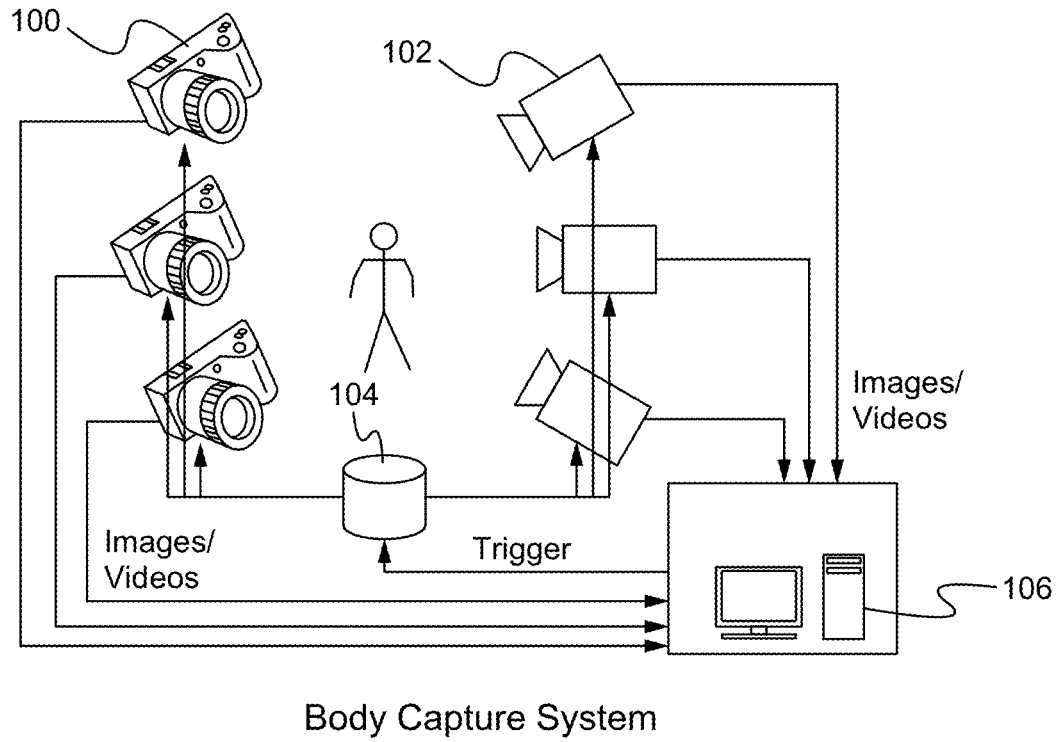
Body Capture System
Fig. 1

PHOTO-VIDEO BASED SPATIAL-TEMPORAL VOLUMETRIC CAPTURE SYSTEM FOR DYNAMIC 4D HUMAN FACE AND BODY DIGITIZATION

CROSS-REFERENCE TO RELATED APPLICATIONS

This application claims priority under 35 U.S.C. § 119(e) of the U.S. Provisional Patent Application Ser. No. 62/782,862, filed Dec. 20, 2018 and titled, "TIME EFFICIENT VIDEO-BASED FACE AND BODY CAPTURE SYSTEM FOR ALBEDO-READY VIRTUAL HUMAN DIGITIZATION, 3D CG MODELING AND NATURAL REENACTMENT," which is hereby incorporated by reference in its entirety for all purposes.

FIELD OF THE INVENTION

The present invention relates to three dimensional computer vision and graphics for the entertainment industry. More specifically, the present invention relates to acquiring and processing three dimensional computer vision and graphics for film, TV, music and game content creation.

BACKGROUND OF THE INVENTION

In the movie/TV industry, physical cast is a major portion of production cost. Moreover, when using a physical cast, there is a risk of production delay due to injury/accident, and a need of complex logistics and coordination for travel. Recent trends show an increasing usage of a digital human cast for virtual production. A digital cast enables humanly impossible superhero actions without placing the real cast in risky stunt actions. However, such VFX is high-cost and time-consuming, which only high-budget sequel movies or TV shows can afford.

In the game industry, the pursuit of realistic game play user experience continues. For the past 10 years, game production cost has risen by ×10. In 2020, average AAA game production cost will reach an estimated $250 M, similar to film budget. The biggest challenge of realistic game play user experience is to create realistic game characters within reasonable time/cost budget. Virtual human creation is highly manual and time-consuming and expensive. As an example, it costs $80-150K per character, and easily adds up to millions of dollars for multiple characters.

Rather than hand-crafting CG artwork from scratch, the recent trend is to efficiently create realistic digital human model by multi-view camera 3D/4D scanners. Various 3D scanner studios (3Lateral, Avatta, TEN24, Pixel Light Effect, Eisko) and 4D scanner studio (4DViews, Microsoft, 8i, DGene) exist world-wide for camera captured based human digitization.

Photo based 3D scanner studio consists of multiple array of high resolution photography cameras. It typically requires manual CG works for animation as it fails to capture natural surface dynamics. Video based 4D scanner (4D=3D+time) studio consists of multiple array of high frame rate machine vision cameras. It captures natural surface dynamics, but it is limited fidelity due to resolution of video camera.

SUMMARY OF THE INVENTION

The photo-video based spatial-temporal volumetric capture system more efficiently produces high frame rate and high resolution 4D dynamic human videos, without a need for 2 separate 3D and 4D scanner systems, and reduces a need for manual CG works, by temporally up-sampling resolution of 4D scanned video data from a temporally sparse set of high-resolution 3D scanned keyframes that capture human dynamics at lower frame rate rather than single static template model at initialization (e.g. A or T pose). Additionally, by utilizing triggering, the video acquisition is optimized such that low resolution multi-view videos are generally captured at high frame rate, but high resolution multi-view photography cameras are captured simultaneously with videos, but at lower frame rate. Keyframes are defined as high resolution 3D scanned models reconstructed using both photography and video cameras that are triggered simultaneously at lower frame rate.

In one aspect, a method comprises capturing content using one or more photography cameras and one or more video cameras, triggering, with a device, the one or more photography cameras and the one or more video cameras to acquire one or more keyframes and generating, with the device, one or more models based on the captured content and the one or more keyframes. Capturing the content includes capturing facial expressions and/or body actions. Triggering includes utilizing trigger timing to simultaneously generating triggers to the one or more photography cameras and the one or more video cameras. Trigger timing of the one or more photography cameras includes periodic triggering. Trigger timing of the one or more photography cameras includes utilizing a human observer to detects a specific facial and/or body expression. Trigger timing of the one or more photography cameras includes automatically detecting a specific facial or body expression by the device, the one or more photography cameras and/or the one or more video cameras. The one or more models are used to implement: mesh-tracking based temporal shape super-resolution on low-resolution but high frame-rate video-based 4D scanned volumetric sequence reined by using high-resolution 3D scanned templates at multiple keyframes, captured by both the one or more photography cameras and the one or more video cameras, for recovering high-resolution surface dynamics in a long action sequence. The one or more models are used to implement: machine learning based temporal texture super-resolution on low-resolution but high frame-rate video-based 4D scanned volumetric sequence refined by training high-resolution and low-resolution UV texture pairs at multiple keyframes, at each keyframe, a high-resolution UV texture map is generated using a photography camera's image data, while a low-resolution UV texture map is generated using a video camera's image data, and a same mesh topology is used such that textures are collocated between high and low resolution UV texture pairs for higher training efficiency. The method further comprises generating computer graphics using the content and the one or more models including the facial expressions and body actions, wherein generating the computer graphics includes utilizing keyframes of the content and non-keyframes of the content to transition between the keyframes.

In another aspect, an apparatus comprises a non-transitory memory for storing an application, the application for: implementing triggering to acquire one or more keyframes, wherein trigger signals are sent to one or more photography cameras and one or more video cameras and generating one or more models based on the one or more keyframes and content captured from the one or more photography cameras and the one or more video cameras and a processor coupled to the memory, the processor configured for processing the application. Triggering includes utilizing trigger timing to simultaneously generating triggers to the one or more photography cameras and the one or more video cameras. Trigger timing of the one or more photography cameras includes periodic triggering. Trigger timing of the one or more photography cameras includes utilizing a human observer to detects a specific facial and/or body expression. Trigger timing of the one or more photography cameras includes automatically detecting a specific facial or body expression by the device, the one or more photography cameras and/or the one or more video cameras. The one or more models are used to implement: mesh-tracking based temporal shape super-resolution on low-resolution but high frame-rate video-based 4D scanned volumetric sequence refined by using high-resolution 3D scanned templates at multiple keyframes, captured by both the one or more photography cameras and the one or more video cameras, for recovering high-resolution surface dynamics in a long action sequence. The one or more models are used to implement: machine learning based temporal texture super-resolution on low-resolution but high frame-rate video-based 3D volumetric sequence refined by training high-resolution and low-resolution UV texture pairs at multiple keyframes, at each keyframe, a high-resolution UV texture map is generated using a photography camera's image data, while a low-resolution UV texture map is generated using video camera's image data, and a same mesh topology is used such that textures are collocated between high and low resolution UV texture pairs for higher training efficiency. The application is further configured for generating computer graphics using the content and the one or more models including the facial expressions and body actions, wherein generating the computer graphics includes utilizing keyframes of the content and non-keyframes of the content to transition between the keyframes.

In another aspect, a system comprises a first set of devices configured for capturing image content of a subject, a second set of devices configured for capturing video content of the subject; and a computing device configured for: implementing triggering to acquire one or more keyframes based on the image content and the video content and generating one or more models based on the image content and the video content and the one or more keyframes. Capturing the content includes capturing facial expressions and/or body actions. Triggering includes utilizing trigger timing to simultaneously generating triggers to the one or more photography cameras and the one or more video cameras. Trigger timing of the one or more photography cameras includes periodic triggering. Trigger timing of the one or more photography cameras includes utilizing a human observer to detects a specific facial and/or body expression. Trigger timing of the one or more photography cameras includes automatically detecting a specific facial or body expression by the computing device, the first set of devices and/or the second set of devices. The one or more models are used to implement: mesh-tracking based temporal shape super-resolution on low-resolution but high frame-rate video-based 4D scanned volumetric sequence refined by using high-resolution 3D scanned templates at multiple keyframes, captured by both the one or more photography cameras and the one or more video cameras, for recovering high-resolution surface dynamics in a long action sequence. The one or more models are used to implement: machine learning based temporal texture super-resolution on low-resolution but high frame-rate video-based 4D scanned volumetric sequence refined by training high-resolution and low-resolution UV texture pairs at multiple keyframes, at each keyframe, a high-resolution UV texture map is generated using a photography camera's image data, while a low-resolution UV texture map is generated using video camera's image data, and a same mesh topology is used such that textures are collocated between high and low resolution UV texture pairs for higher training efficiency. The computing device is further configured for generating computer graphics using the image content and the video content and the one or more models including facial expressions and body actions, wherein generating the computer graphics includes utilizing keyframes of the content and non-keyframes of the content to transition between the keyframes.

BRIEF DESCRIPTION OF THE DRAWINGS

FIG. 1 illustrates diagrams of a face capture system and a body capture system according to some embodiments.

DETAILED DESCRIPTION OF THE PREFERRED EMBODIMENT

Figure 2:
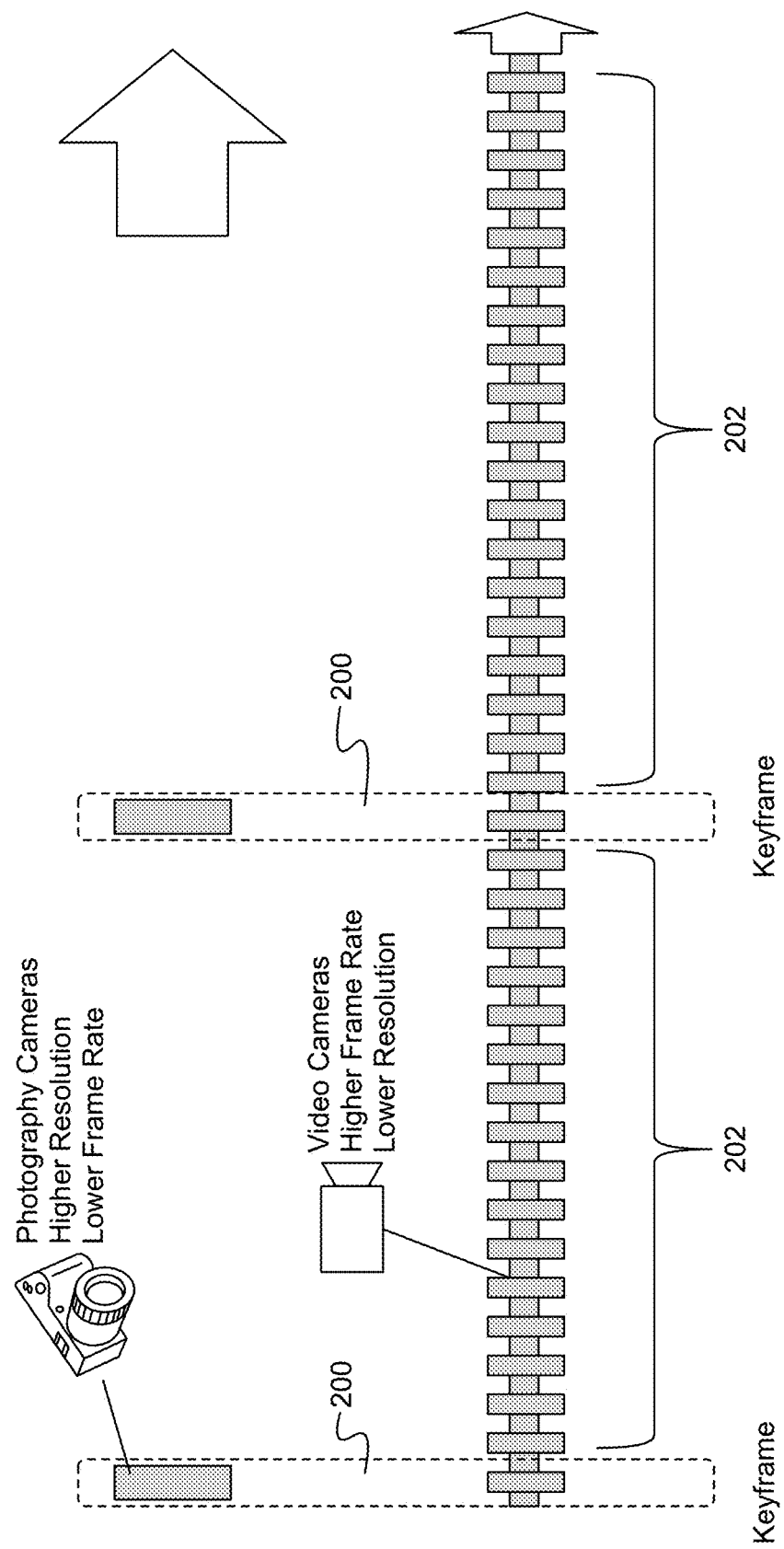
FIG. 2 illustrates a diagram of a triggering mechanism according to some embodiments.

A time-efficient but photorealistic 3D face and body capture system is needed. As mentioned, one issue is a time-consuming photo-image based 3D capture system and resulting modeling and animation pipeline. Per each facial expression (or body pose), a subject typically stays still during sweeping under various conditions: e.g., across-cameras, across various light directions, forcing the subject's unnatural face/body expression. The subject repeats this for various facial expressions or body poses (e.g., >10). State of the art face capture light stage typically needs ~20 min capture time per facial expression. Once all data is captured, CG animator clean-up, remesh static models at each expression and create FACS (Face Action Coding System) based dynamic animatable model for animation. Since transition between expressions are not captured by 3D scanner, CG animator typically hand-crafts detail surface dynamics manually, and this workflow normally takes months. 4D scanner is often used as a reference for animators, but typically cannot be used in FACS modeling pipeline, due to limited resolution of machine vision video based 4D scanners.

FIG. 1 illustrates diagrams of a face capture system and a body capture system according to some embodiments. One or more photography cameras 100 acquire images. The one or more photography cameras 100 are able to be multi-view, high-resolution (e.g., 42 megapixels) photography cameras (e.g., DSLR cameras), but the frame-rate is typically limited (e.g., 2 fps). One or more video cameras 120 acquire video information. The one or more video cameras are able to be multi-view high frame-rate machine vision cameras 60 fps), but the resolution is limited (e.g., 8 megapixels). For example, the one or more photography cameras 100 and the one or more video cameras 102 acquire images and videos of a person where the video includes various facial expressions and body movements.

A trigger mechanism 104 is implemented to simultaneously generate triggers to photography cameras and video (machine vision) cameras. The trigger mechanism 104 is able to be implemented in any manner such as in an application stored in the one or more photography cameras 100, the one or more video cameras 102, and/or one or more computing devices 106. In some embodiments, where the trigger mechanism 104 is controlled by the one or more computing devices 106, the trigger mechanism 104 simultaneously sends triggers to the multi-view photography cameras 100 and video cameras 102, while a higher trigger rate is maintained with the video cameras (e.g. 2 fps for photography cameras, 60 fps for video cameras).

In some embodiments, a keyframe is defined as a frame when both photography and video cameras are triggered simultaneously, and therefore, high-resolution 3D template models are reconstructed. Other frames are defined as non-keyframes when only lower resolution video cameras are triggered, and so, reconstructed 4D models are up-sampled using higher resolution 3D template keyframes.

Trigger timing of photography cameras includes 3 use cases: 1) Periodic (e.g., 2 fps): to up-sample video-based lower-resolution 4D scanned volumetric sequence (e.g., 60 fps) between higher-resolution 3D scanned keyframes, 2) Semi-automatic: when a human observer detects certain facial or body expressions, 3) Automatic: when a specific facial or body expression is detected by the computing device, one or more photography cameras and/or one or more video cameras (e.g., using template matching or any other mechanism to detect expressions).

The one or more computing devices 106 initiate the capture process and acquire a sequence of images/videos from the one or more photography cameras 100 and the one or more video cameras 102. The image/video information is received at and/or transmitted to one or more computing devices 106 where the video information is processed. For example, the one or more computing devices 106 process the video information and generate CO content (e.g., perform modeling).

Using the multiple high-resolution 3D scanned template keyframe models, the system is able to implement: mesh-tracking based temporal shape super-resolution (up-sampling) on low-resolution but high frame-rate video-based 4D scanned volumetric sequence refined by using high-resolution 3D templates at multiple keyframes, captured by both photography cameras 100 and video cameras 102, for recovering high-resolution surface dynamics in a long action sequence. The system is also able to implement: machine learning based temporal texture super-resolution (up-sampling) on low-resolution but high frame-rate video-based 4D scanned volumetric sequence refined by training high-resolution and low-resolution UV texture pairs simultaneously triggered and captured at multiple keyframes (high-resolution texture from multi-view photography cameras 100 and low-resolution texture from multi-view video cameras 102).

FIG. 2 illustrates a diagram of a triggering mechanism according to some embodiments. As discussed above, a keyframe 200 is when both photography and video cameras are triggered simultaneously, and therefore, high-resolution 3D template models are reconstructed. Non-keyframes 202 are when only lower resolution video cameras are triggered, and so, reconstructed 4D models are up-sampled for refinement. Non-keyframes include a lower resolution volumetric sequence, intended to be temporally up-sampled using key-frames, by applying 1) mesh-tracking based temporal shape super resolution, and 2) machine learning based temporal texture super-resolution.

High-resolution 3D template models are reconstructed at keyframes. Higher resolution shape reconstruction is possible, using both multi-view photography cameras and machine vision cameras. High resolution and low resolution UV texture pairs are used as training dataset for machine learning based texture super resolution.

Trigger timing of photography cameras includes the following 3 use cases:

Periodic 2 fps): to up-sample video-based low-resolution volumetric sequence (e.g., 60 fps) between keyframes;

Semi-automatic: when human observer detects certain face or body expression;

Automatic: when specific face or body expression is detected.

Figure 3:
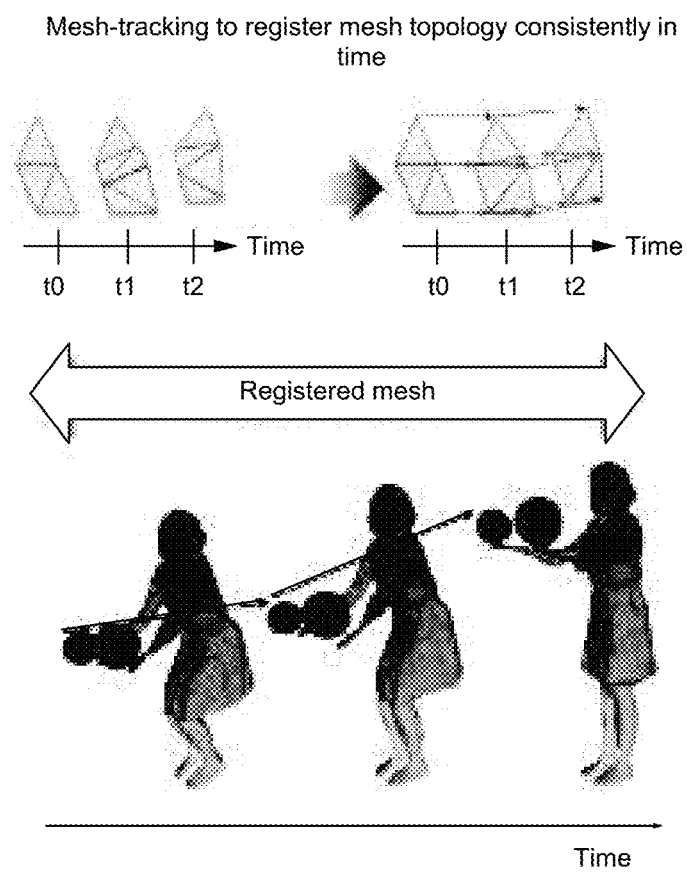
FIG. 3 illustrates a diagram of mesh tracking according to some embodiments.

FIG. 3 illustrates a diagram of mesh tracking according to some embodiments. Mesh tracking involves registering mesh topology consistently in time.

Figure 4:
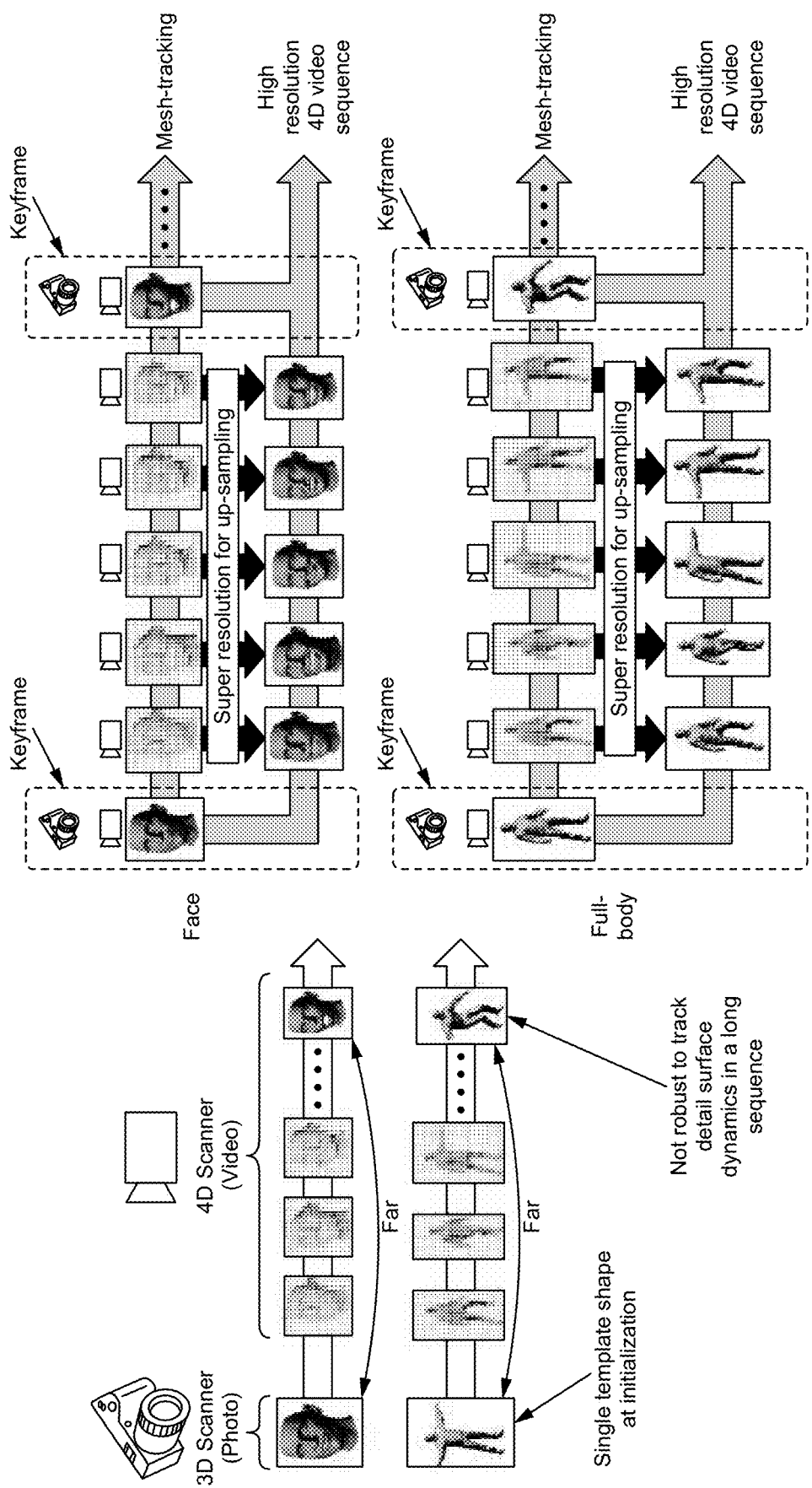
FIG. 4 illustrates a diagram of mesh-tracking based temporal shape super-resolution according to some embodiments.

FIG. 4 illustrates a diagram of mesh-tracking based temporal shape super-resolution according to some embodiments.

The left side of FIG. 4 shows a single template based performance capture. There is no robust up-sampling of detail surface dynamics. There are two separate stages of 3D and 4D scanning.

The right side of FIG. 4 shows multi-keyframes based shape super resolution, which robustly adapts to detail surface dynamics. The 4D scanner is combined with multiple 3D templates within a sequence.

Figure 5:
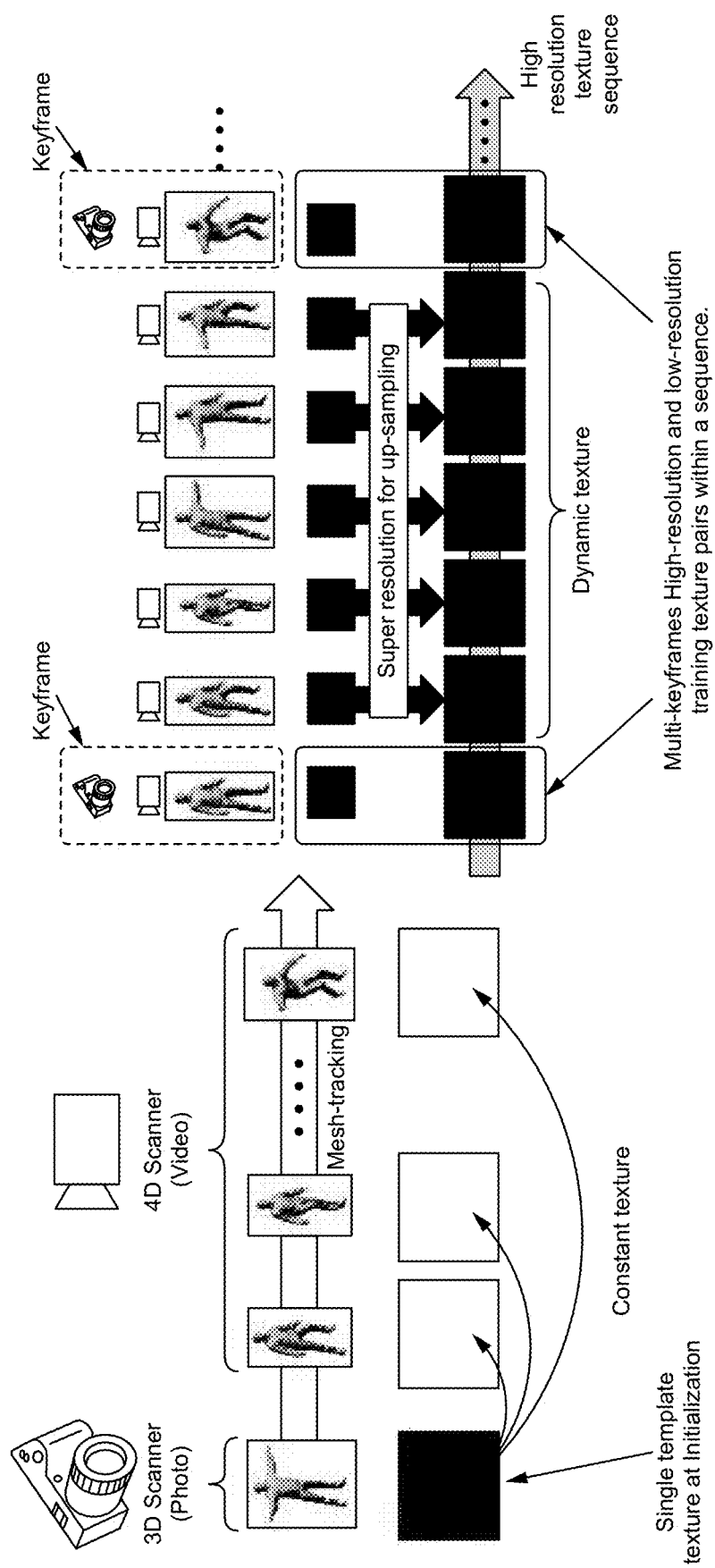
FIG. 5 illustrates a diagram of machine learning based texture super resolution according to some embodiments.

FIG. 5 illustrates a diagram of machine learning based texture super resolution according to some embodiments.

The left side of FIG. 5 shows a single template based performance capture. There is constant texture from a single template based on a tracked mesh.

The right side of FIG. 5 shows machine learning based texture super resolution, which adapts to texture changes, and uses a multiple keyframe texture training dataset within a sequence.

Figure 6:
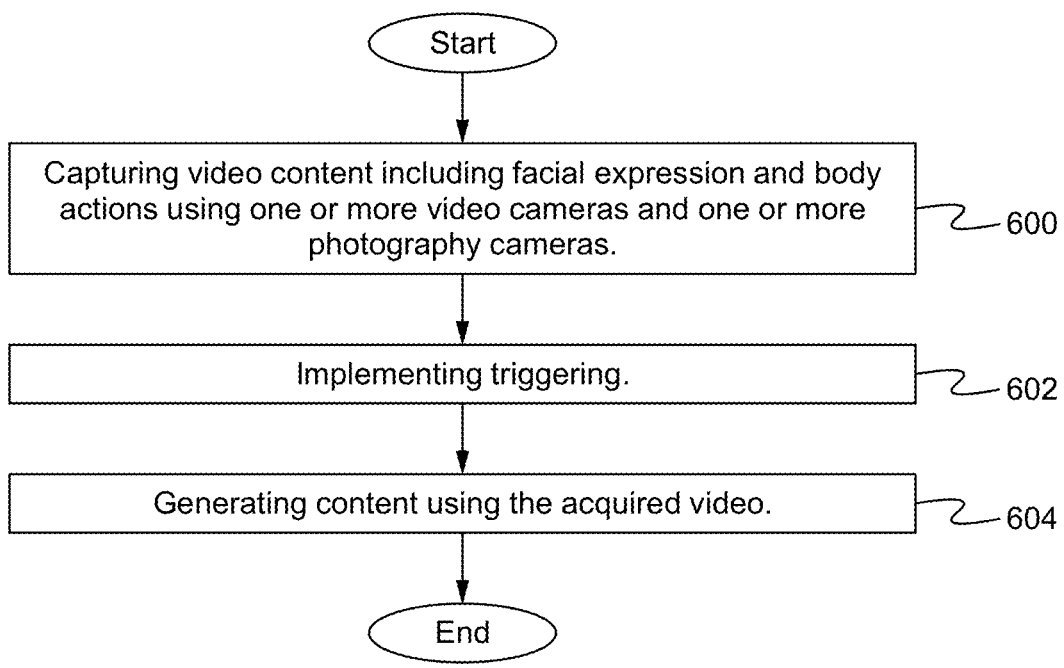
FIG. 6 illustrates a flowchart of a method of implementing a time efficient video-based frame-rate capture system according to some embodiments.

FIG. 6 illustrates a flowchart of a method of implementing a photo-video based spatial-temporal volumetric capture system according to some embodiments. In the step 600, content (e.g., image/video content) including facial expression and body actions is captured using one or more video cameras and one or more photography cameras. In the step 602, triggering is implemented to acquire one or more keyframes. Triggering includes simultaneously generating triggers to the photography cameras and video cameras. Trigger timing of photography cameras includes 3 use cases: 1) Periodic (e.g., 2 fps): to up-sample lower resolution video-based 4D scanned volumetric sequence (e.g., 60 fps) between keyframe higher resolution 3D template models, 2) Semi-automatic: when a human observer detects certain facial or body expressions, 3) Automatic: when a specific facial or body expression is detected by the computing device (e.g., using template matching, machine learning, and/or any other mechanism to detect expressions). In the step 604, content is generated using the acquired video. For example, using the acquired content, a CG avatar is able to be deployed in a movie or other video. Generating the content is able to include generating multiple high-resolution template models. Using the multiple high-resolution template models, the system is able to implement: mesh-tracking based temporal shape super-resolution (up-sampling) on low-resolution but high frame-rate video-based 4D scanned volumetric sequence refined by using high-resolution templates at multiple keyframes, captured by both photography cameras and video cameras, for recovering high-resolution surface dynamics in a long action sequence. The system is also able to implement: machine learning based temporal texture super-resolution (up-sampling) on low-resolution but high frame-rate video-based volumetric sequence refined by training high-resolution and low-resolution UV texture pairs triggered and captured simultaneously at multiple keyframes (high-resolution texture from multi-view photography cameras and low-resolution texture from multi-view video cameras). In some embodiments, fewer or additional steps are implemented. In some embodiments, the order of the steps is modified.

Figure 7:
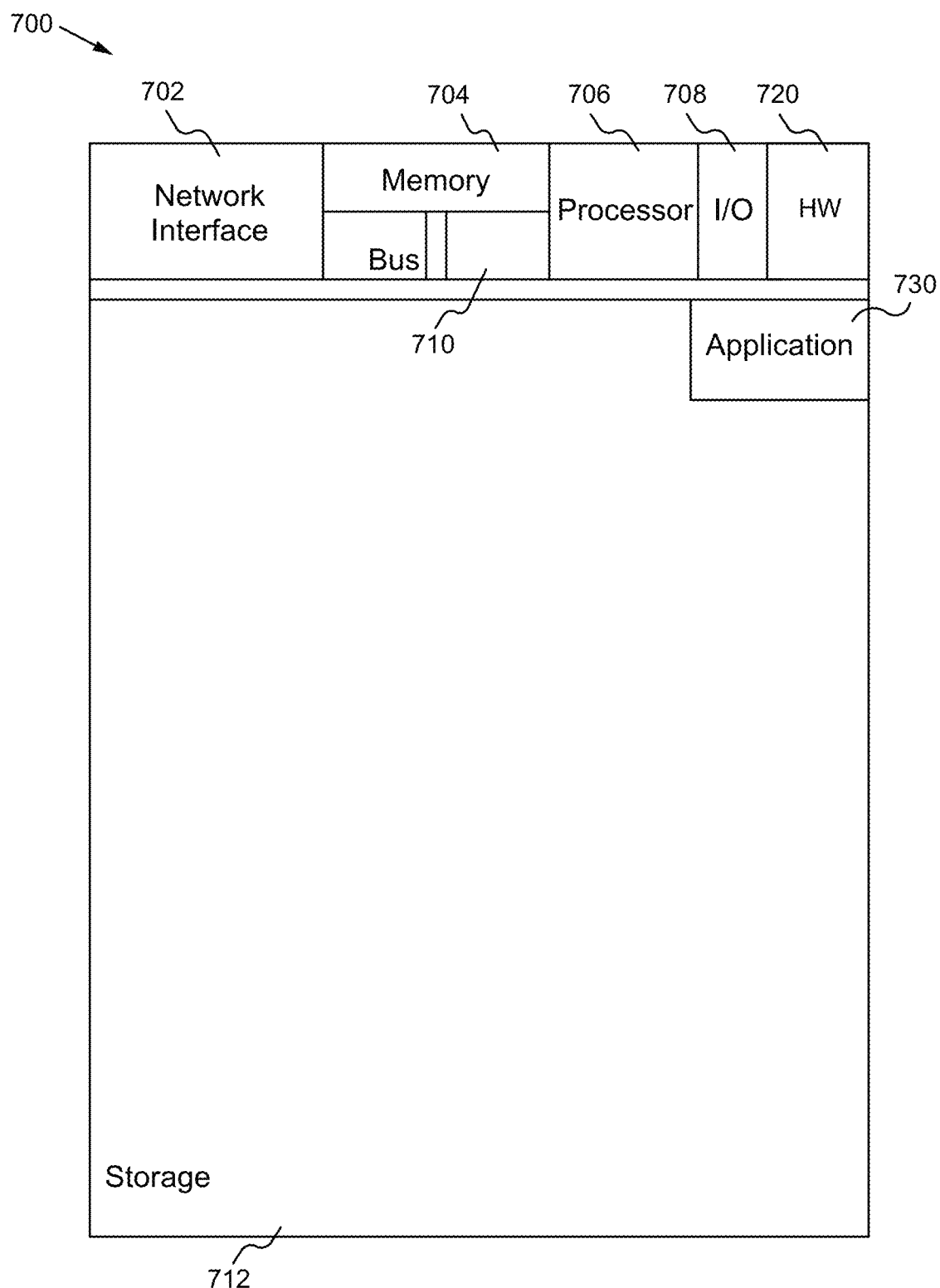
FIG. 7 illustrates a block diagram of an exemplary computing device configured to implement the photo-video based spatial-temporal volumetric capture system according to some embodiments.

FIG. 7 illustrates a block diagram of an exemplary computing device configured to implement the photo-video based spatial-temporal volumetric capture system according to some embodiments. The computing device 700 is able to be used to acquire, store, compute, process, communicate and/or display information such as images and videos including 3D content. The computing device 700 is able to implement any of the time efficient video-based frame-rate capture system aspects. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, High Definition disc/drive, ultra-HD drive, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, screen, printer, modem, touchscreen, button interface and other devices. Photo-video based spatial-temporal volumetric capture application(s) 730 used to implement the photo-video based spatial-temporal volumetric capture system are likely to be stored in the storage device 712 and memory 704 and processed as applications are typically processed. More or fewer components shown in FIG. 7 are able to be included in the computing device 700. In some embodiments, photo-video based spatial-temporal volumetric capture hardware 720 is included. Although the computing device 700 in FIG. 7 includes applications 730 and hardware 720 for the photo-video based spatial-temporal volumetric capture system, the photo-video based spatial-temporal volumetric capture system is able to be implemented on a computing device in hardware, firmware, software or any combination thereof. For example, in some embodiments, the photo-video based spatial-temporal volumetric capture applications 730 are programmed in a memory and executed using a processor. In another example, in some embodiments, the photo-video based spatial-temporal volumetric capture hardware 720 is programmed hardware logic including gates specifically designed to implement the photo-video based spatial-temporal volumetric capture system.

In some embodiments, the photo-video based spatial-temporal volumetric capture application(s) 730 include several applications and/or modules. In some embodiments, modules include one or more sub-modules as well. In some embodiments, fewer or additional modules are able to be included.

In some embodiments, the photo-video based spatial-temporal volumetric capture hardware 720 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the photo-video based spatial-temporal volumetric capture system described herein, a device acquires video content using triggering to capture image and video content. The photo-video based spatial-temporal volumetric capture system is able to be implemented with user assistance or automatically without user involvement. Any number of cameras are able to be utilized to implement the photo-video based spatial-temporal volumetric system.

In operation, the photo-video based spatial-temporal volumetric capture system creates high frame rate as well as high resolution 4D scanned human dynamic volumetric videos by acquiring photography images and videos simultaneously and by up-sampling lower resolution 4D scanned video from higher resolution 3D scanned keyframe template models reconstructed using both photography cameras and video cameras. The photo-video based spatial-temporal volumetric capture system generates multiple high-resolution template models within the sequence for offline shape and texture super resolution. Using the multiple keyframe high-resolution template models, the system allows: mesh-tracking based temporal shape super resolution to recover high-resolution surface dynamics in a long action sequence. A typical performance capture system has a limited ability of recovering surface dynamics (e.g., outfit) from single template (e.g., A-pose). The system described herein is able to provide multiple keyframe datasets of high-resolution and low-resolution UV texture pairs for training.

Some Embodiments of Photo-Video Based Spatial-Temporal Volumetric Capture System for Dynamic 4D Human Face and Body Digitization 1. A method comprising:
    capturing content using one or more photography cameras and one or more video cameras;
    triggering, with a device, the one or more photography cameras and the one or more video cameras to acquire one or more keyframes; and
    generating, with the device, one or more models based on the captured content and the one or more keyframes.
2. The method of clause 1 wherein capturing the content includes capturing facial expressions and/or body actions.
3. The method of clause 1 wherein triggering includes utilizing trigger timing to simultaneously generating triggers to the one or more photography cameras and the one or more video cameras.
4. The method of clause 3 wherein trigger timing of the one or more photography cameras includes periodic triggering.

5. The method of clause 3 wherein trigger timing of the one or more photography cameras includes utilizing a human observer to detects a specific facial and/or body expression.
6. The method of clause 3 wherein trigger timing of the one or more photography cameras includes automatically detecting a specific facial or body expression by the device, the one or more photography cameras and/or the one or more video cameras.
7. The method of clause 1 wherein the one or more models are used to implement: mesh-tracking based temporal shape super-resolution on low-resolution but high frame-rate video-based 4D scanned volumetric sequence refined by using high-resolution 3D scanned templates at multiple keyframes, captured by both the one or more photography cameras and the one or more video cameras, for recovering high-resolution surface dynamics in a long action sequence.
8. The method of clause 1 wherein the one or more models are used to implement: machine learning based temporal texture super-resolution on low-resolution but high frame-rate video-based 4D scanned volumetric sequence refined by training high-resolution and low-resolution UV texture pairs at multiple keyframes, at each keyframe, a high-resolution UV texture map is generated using a photography camera's image data, while a low-resolution UV texture map is generated using video camera's image data, and a same mesh topology is used such that textures are collocated between high and low resolution UV texture pairs for higher training efficiency.
9. The method of clause 1 further comprising generating computer graphics using the content and the one or more models including the facial expressions and body actions, wherein generating the computer graphics includes utilizing keyframes of the content and non-keyframes of the content to transition between the keyframes.
10. An apparatus comprising:
   a non-transitory memory for storing an application, the application for:
      implementing triggering to acquire one or more keyframes, wherein trigger signals are sent to one or more photography cameras and one or more video cameras; and
      generating one or more models based on the one or more keyframes and content captured from the one or more photography cameras and the one or more video cameras; and
   a processor coupled to the memory, the processor configured for processing the application.
11. The apparatus of clause 10 wherein triggering includes utilizing trigger timing to simultaneously generating triggers to the one or more photography cameras and the one or more video cameras.
12. The apparatus of clause 11 wherein trigger timing of the one or more photography cameras includes periodic triggering.
13. The apparatus of clause 11 wherein trigger timing of the one or more photography cameras includes utilizing a human observer to detects a specific facial and/or body expression.
14. The apparatus of clause 11 wherein trigger timing of the one or more photography cameras includes automatically detecting a specific facial or body expression by the device, the one or more photography cameras and/or the one or more video cameras.
15. The apparatus of clause 10 wherein the one or more models are used to implement: mesh-tracking based temporal shape super-resolution on low-resolution but high frame-rate video-based 4D scanned volumetric sequence refined by using high-resolution 3D scanned templates at multiple keyframes, captured by both the one or more photography cameras and the one or more video cameras, for recovering high-resolution surface dynamics in a long action sequence.
16. The apparatus of clause 10 wherein the one or more models are used to implement: machine learning based temporal texture super-resolution on low-resolution but high frame-rate video-based 4D scanned volumetric sequence refined by training high-resolution and low-resolution UV texture pairs at multiple keyframes, at each keyframe, a high-resolution UV texture map is generated using a photography camera's image data, while a low-resolution UV texture map is generated using video camera's image data, and a same mesh topology is used such that textures are collocated between high and low resolution UV texture pairs for higher training efficiency.
17. The apparatus of clause 10 wherein the application is further configured for generating computer graphics using the content and the one or more models including the facial expressions and body actions, wherein generating the computer graphics includes utilizing keyframes of the content and non-keyframes of the content to transition between the keyframes.
18. A system comprising:
   a first set of devices configured for capturing image content of a subject;
   a second set of devices configured for capturing video content of the subject; and
   a computing device configured for:
      implementing triggering to acquire one or more keyframes based on the image content and the video content; and
      generating one or more models based on the image content and the video content and the one or more keyframes.
19. The system of clause 18 wherein capturing the content includes capturing facial expressions and/or body actions.
20. The system of clause 18 wherein triggering includes utilizing trigger timing to simultaneously generating triggers to the one or more photography cameras and the one or more video cameras.
21. The system of clause 20 wherein trigger timing of the one or more photography cameras includes periodic triggering.
22. The system of clause 20 wherein trigger timing of the one or more photography cameras includes utilizing a human observer to detects a specific facial and/or body expression.
23. The system of clause 20 wherein trigger timing of the one or more photography cameras includes automatically detecting a specific facial or body expression by the computing device, the first set of devices and/or the second set of devices.
24. The system of clause 18 wherein the one or more models are used to implement: mesh-tracking based temporal shape super-resolution on low-resolution but high frame-rate video-based 4D scanned volumetric sequence refined by using high-resolution 3D scanned templates at multiple keyframes, captured by both the one or more photography cameras and the one or more video cameras, for recovering high-resolution surface dynamics in a long action sequence.

25. The system of clause 18 wherein the one or more models are used to implement: machine learning based temporal texture super-resolution on low-resolution but high frame-rate video-based 4D scanned volumetric sequence refined by training high-resolution and low-resolution UV texture pairs at multiple keyframes, at each keyframe, a high-resolution UV texture map is generated using a photography camera's image data, while a low-resolution UV texture map is generated using video camera's image data, and a same mesh topology is used such that textures are collocated between high and low resolution UV texture pairs for higher training efficiency.

26. The system of clause 18 wherein the computing device is further configured for generating computer graphics using the image content and the video content and the one or more models including facial expressions and body actions, wherein generating the computer graphics includes utilizing keyframes of the content and non-keyframes of the content to transition between the keyframes.

What is claimed is:

1. A method comprising:
    capturing content using one or more photography cameras and one or more video cameras, wherein capturing the content includes capturing dynamic facial expressions and dynamic body actions with the one or more photography cameras and one or more video cameras;
    triggering, with a device, the one or more photography cameras and the one or more video cameras to acquire one or more keyframes; and
    generating, with the device, one or more models based on the captured content and the one or more keyframes, wherein the one or more models are used to implement: mesh-tracking based temporal shape super-resolution on a first resolution but a first frame-rate video-based 4D scanned volumetric sequence refined by using 3D scanned second resolution, higher than the first resolution, templates at multiple keyframes, captured by both the one or more photography cameras and the one or more video cameras, for recovering second resolution, higher than the first resolution surface dynamics in an action sequence.

2. The method of claim 1 wherein triggering includes utilizing trigger timing to simultaneously generate triggers to the one or more photography cameras and the one or more video cameras.

3. The method of claim 2 wherein trigger timing of the one or more photography cameras includes periodic triggering.

4. The method of claim 2 wherein trigger timing of the one or more photography cameras includes utilizing a human observer to detect a specific facial and/or body expression.

5. The method of claim 2 wherein trigger timing of the one or more photography cameras includes automatically detecting a specific facial or body expression by the device, the one or more photography cameras and/or the one or more video cameras.

6. The method of claim 1 wherein the one or more models are used to implement: machine learning based temporal texture super-resolution on the first resolution but the first frame-rate video-based 4D scanned volumetric sequence refined by training second resolution, higher than the first resolution, and first resolution, lower than the second resolution, UV texture pairs at multiple keyframes, at each keyframe, a second resolution UV texture map is generated using a photography camera's image data, while a first resolution UV texture map is generated using a video camera's image data, and a same mesh topology is used such that textures are collocated between second and first resolution UV texture pairs for training efficiency.

7. The method of claim 1 further comprising generating computer graphics using the content and the one or more models including facial expressions and body actions, wherein generating the computer graphics includes utilizing keyframes of the content and non-keyframes of the content to transition between the keyframes.

8. The method of claim 1 wherein triggering includes simultaneously sending a first set of triggers to the one or more photography cameras and a second set of triggers to the one or more video cameras including maintaining a higher trigger rate with the one or more video cameras than the one or more photography cameras.

9. An apparatus comprising:
    a non-transitory memory for storing an application, the application for:
        implementing triggering to acquire one or more keyframes, wherein trigger signals are sent to one or more photography cameras and one or more video cameras, wherein trigger timing of the one or more photography cameras includes automatically detecting a specific facial and body expression by the one or more photography cameras and the one or more video cameras; and
        generating one or more models based on the one or more keyframes and content captured from the one or more photography cameras and the one or more video cameras, wherein the one or more models are used to implement: mesh-tracking based temporal shape super-resolution on a first resolution but a first frame-rate video-based 4D scanned volumetric sequence refined by using 3D scanned second resolution, higher than the first resolution, templates at multiple keyframes, captured by both the one or more photography cameras and the one or more video cameras, for recovering second resolution, higher than the first resolution surface dynamics in an action sequence; and
    a processor coupled to the memory, the processor configured for processing the application.

10. The apparatus of claim 9 wherein triggering includes utilizing trigger timing to simultaneously generate triggers to the one or more photography cameras and the one or more video cameras.

11. The apparatus of claim 10 wherein trigger timing of the one or more photography cameras includes periodic triggering.

12. The apparatus of claim 10 wherein trigger timing of the one or more photography cameras includes utilizing a human observer to detect a specific facial and/or body expression.

13. The apparatus of claim 9 wherein the one or more models are used to implement: machine learning based temporal texture super-resolution on the first resolution but the first frame-rate video-based 4D scanned volumetric sequence refined by training second resolution, higher than the first resolution, and first resolution, lower than the second resolution, UV texture pairs at multiple keyframes, at each keyframe, a second resolution UV texture map is generated using a photography camera's image data, while a first resolution UV texture map is generated using a video camera's image data, and a same mesh topology is used such that textures are collocated between second and first resolution UV texture pairs for training efficiency.

14. The apparatus of claim 9 wherein the application is further configured for generating computer graphics using the content and the one or more models including facial expressions and body actions, wherein generating the computer graphics includes utilizing keyframes of the content and non-keyframes of the content to transition between the keyframes.

15. A system comprising:
a first set of devices configured for capturing image content of a subject;
a second set of devices configured for capturing video content of the subject, wherein capturing the image content and the video content includes capturing facial expressions and body actions; and
a computing device configured for:
implementing triggering to acquire one or more keyframes based on the image content and the video content; and
generating one or more models based on the image content and the video content and the one or more keyframes, wherein the one or more models are used to implement: mesh-tracking based temporal shape super-resolution on a first resolution but a first frame-rate video-based 4D scanned volumetric sequence refined by using 3D scanned second resolution, higher than the first resolution, templates at multiple keyframes, captured by both the one or more photography cameras and the one or more video cameras, for recovering second resolution, higher than the first resolution surface dynamics in an action sequence.

16. The system of claim 15 wherein triggering includes utilizing trigger timing to simultaneously generate triggers to the one or more photography cameras and the one or more video cameras.

17. The system of claim 16 wherein trigger timing of the one or more photography cameras includes periodic triggering.

18. The system of claim 16 wherein trigger timing of the one or more photography cameras includes utilizing a human observer to detect a specific facial and/or body expression.

19. The system of claim 16 wherein trigger timing of the one or more photography cameras includes automatically detecting a specific facial or body expression by the computing device, the first set of devices and/or the second set of devices.

20. The system of claim 15 wherein the one or more models are used to implement: machine learning based temporal texture super-resolution on the first resolution but the first frame-rate video-based 4D scanned volumetric sequence refined by training second resolution, higher than the first resolution, and first resolution, lower than the second resolution, UV texture pairs at multiple keyframes, at each keyframe, a second resolution UV texture map is generated using a photography camera's image data, while a first resolution UV texture map is generated using a video camera's image data, and a same mesh topology is used such that textures are collocated between second and first resolution UV texture pairs for training efficiency.

21. The system of claim 15 wherein the computing device is further configured for generating computer graphics using the image content and the video content and the one or more models including facial expressions and body actions, wherein generating the computer graphics includes utilizing keyframes of the content and non-keyframes of the content to transition between the keyframes.

* * * * *